(12) United States Patent
Stoller et al.

(10) Patent No.: US 8,473,170 B2
(45) Date of Patent: Jun. 25, 2013

(54) CLOSED LOOP TRANSMISSION TORQUE CONTROL

(75) Inventors: Jason Stoller, Morton, IL (US); Adam Vaccari, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 363 days.

(21) Appl. No.: 12/884,772

(22) Filed: Sep. 17, 2010

(65) Prior Publication Data

US 2012/0072084 A1    Mar. 22, 2012

(51) Int. Cl.
*G06F 19/00* (2011.01)

(52) U.S. Cl.
USPC ............. 701/60; 701/53; 701/58; 700/42; 700/45; 700/72

(58) Field of Classification Search
USPC ........... 701/51–55, 58–61; 703/2; 700/40–45, 700/71, 72, 275
See application file for complete search history.

(56) References Cited

U.S. PATENT DOCUMENTS

| | | | |
|---|---|---|---|
| 3,900,075 A | 8/1975 | Chichester et al. | |
| 4,982,822 A | 1/1991 | Petzold et al. | |
| 5,062,050 A | 10/1991 | Petzold et al. | |
| 5,074,166 A | 12/1991 | Yamashita et al. | |
| 5,147,010 A * | 9/1992 | Olson et al. | 180/197 |
| 5,301,768 A | 4/1994 | Ishikawa et al. | |
| 5,521,819 A * | 5/1996 | Greenwood | 701/60 |
| 5,682,315 A | 10/1997 | Coutant et al. | |
| 6,052,644 A | 4/2000 | Murakami et al. | |
| 6,385,970 B1 | 5/2002 | Kuras et al. | |
| 6,397,152 B1 * | 5/2002 | Kalweit et al. | 702/41 |
| 6,497,636 B2 * | 12/2002 | Schleicher et al. | 477/37 |
| 7,194,349 B2 | 3/2007 | Surianarayanan et al. | |
| 7,860,631 B2 * | 12/2010 | Williams | 701/54 |
| 7,974,760 B2 * | 7/2011 | Rowley et al. | 701/70 |
| 8,000,863 B2 * | 8/2011 | DeMarco et al. | 701/51 |
| 8,296,024 B2 * | 10/2012 | Stoller et al. | 701/60 |
| 2008/0300103 A1 | 12/2008 | DeMarco et al. | |
| 2012/0161442 A1 * | 6/2012 | Chapple | 290/44 |

FOREIGN PATENT DOCUMENTS

| | | |
|---|---|---|
| EP | 0579960 B1 | 12/1997 |
| JP | 11311314 | 11/1999 |
| JP | 2005337462 A | 12/2005 |
| JP | 4198937 B2 | 12/2008 |

OTHER PUBLICATIONS

Tikkanen et al, Fuzzy Controllers in Hydrostatic Transmission, IEE Colloquium on Innovative Actuators for Mechatronic Systems, 1995, pp. 15/1-15/3.*

Schulte, H. Control-Oriented Modeling of Hydrostatic Transmissions Using Takagi-Sugeno Fuzzy Systems, IEEE International Fuzzy Systems Conference, 2007, pp. 1-6.*

(Continued)

*Primary Examiner* — Russell Frejd
(74) *Attorney, Agent, or Firm* — Leydig, Voit & Mayer (57) ABSTRACT

The described system and method provide improved transmission performance and response with closed loop torque feedback by implementing situational gain scheduling and nonlinear control techniques for continuously variable transmissions. The system uses contextual information regarding the operation of the machine to determine a gain to be applied in associated PID control logic. In an embodiment, the determined gain is applied in the integral portion of the closed loop controller.

20 Claims, 5 Drawing Sheets

OTHER PUBLICATIONS

Dasgupta et al, Open-Loop Dynamic Performance of a Servo-Valve Controlled Motor Transmission System with Pump Loading Using Steady-State Characteristics, Mechanism and Machine Theory, vol. 41, Iss. 3, Mar. 2006, pp. 262-282.*

Kugi et al, Modeling and Simulation of a Hydrostatic Transmission with Variable-Displacement Pump, Mathematics and Computers in Simulation, vol. 53, Iss. 4-6, Oct. 2000, pp. 409-414.*

* cited by examiner

CLOSED LOOP TRANSMISSION TORQUE CONTROL

TECHNICAL FIELD

This patent disclosure relates generally to transmission systems for propulsion and, more particularly to a method and system for exercising closed loop control of the torque of the transmission output.

BACKGROUND

A system that provides a rotating shaft output can be classified by speed, power, and torque. Although these measures are related in some ways, the concept of torque may be more closely aligned with the experience of the user is operating such a machine. However, in certain environments, it is traditionally difficult to control torque accurately due to due to the slow frequency response and non-linear behavior of the transmission.

While simple PID control schemes may be used, such systems will generally not be able accurately control the output torque of the transmission. This is primarily due to the control lag, and may result in oscillation, instability, and a generally poor user experience. Although the application of gains can speed response time, it may also result in instability and over-control. In particular, while inadequate gains will not be sufficient to alleviate the lag problem, excessive gains may cause control ringing or under-damped oscillation.

It will be appreciated that this background description has been created by the inventors to aid the reader, and represents concepts known to the inventors. It is not a discussion of, nor reference to, prior art, nor is this section intended to imply that any of the indicated problems were themselves appreciated in the art. While the principles described herein can, in some regards and embodiments, avoid the problems described, it will be appreciated that the scope of the protected innovation is defined by the attached claims, and not by the ability of the claimed invention to solve any specific problem noted herein.

SUMMARY

The disclosed techniques and structures provide improved transmission performance and response with closed loop torque feedback by implementing situational gain scheduling and nonlinear control techniques for continuously variable transmissions. In an embodiment, the system determines and employs contextual information regarding the operation of the machine, such as machine operator inputs and transmission dynamics, to identify the machine operation state, machine dynamics, and transmission dynamics.

The state information is employed, in conjunction with operator inputs and transmission dynamics information to gain schedule associated PID control logic. For very low system frequency response transmission systems especially, the use of this method for gain scheduling, e.g., with respect to the integral portion of the closed loop controller, has a significant impact in facilitating effective closed loop torque control.

Further and alternative aspects and features of the disclosed principles will be appreciated from the following detailed description and the accompanying drawings, of which:

DETAILED DESCRIPTION

This disclosure relates to machines requiring a transmission to link a power source to the final ground-engaging mechanism, e.g., wheels, tracks, etc., and/or to other powered functions or implements. Examples of such machines include those used for mining, construction, farming, transportation, or any other industry known in the art. The machine may be an earth-moving machine, such as a wheel loader, excavator, dump truck, backhoe, motor grader, material handler or the like. Moreover, one or more implements may be connected to the machine for a variety of tasks, including, for example, loading, compacting, lifting, brushing, and include, for example, buckets, compactors, forked lifting devices, brushes, grapples, cutters, shears, blades, breakers/hammers, augers, and others. In an example embodiment, the system is applied to a continuously variable transmission (CVT) as may be used in wheel loader or motor grader machine applications.

In overview, the described system and control method may be used in any suitable machine, including but not limited to medium sized machines. Moreover, the described configuration may alternatively be used with a generator/motor combination to replace a hydrostatic transmission. As noted above, simple speed control does not work in this type of transmission due to the slow response. The described system provides torque control for a hydrostatic transmission via a combination of open loop control, closed loop control, and a variable gain, selected as a function of work parameters.

The hydrostatic transmission includes a variable displacement pump and motor, and is used in combination with mechanical gearing in a transmission powered by an engine, e.g., one that is operated at a substantially constant speed. A pressure and gear setting determine the transmission output torque. In other words, the drive line is torque-controlled by controlling the actuator/circuit pressure in the hydrostatic transmission. The combination of open loop control and closed loop control overcomes difficulties that would be experienced during the use of closed-loop-only controls. In physical terms, the control is accomplished by controlling the swashplate angle on the variable displacement pump. The swashplate angle is in turn controlled by the swashplate actuator.

The closed loop portion of the system uses a PID controller. In certain situations, excessively high gain factors in the closed loop part of the system can cause the system to become unstable. On the other hand, small conservative gain factors sacrifice response time. The present control method has been developed to use different gain factors depending on machine operating parameters such as speed, torque, and direction.

The method applies higher gain factors to provide a better response time in situations wherein empirical data shows that the system will tolerate, i.e., remain stable with, high gain factors. In other situations, when the system is at a risk of instability if higher gains are used, lower gain factors are applied. The applied gain scheduling data may be stored in look-up maps or may be implemented in a state machine.

Figure 1:
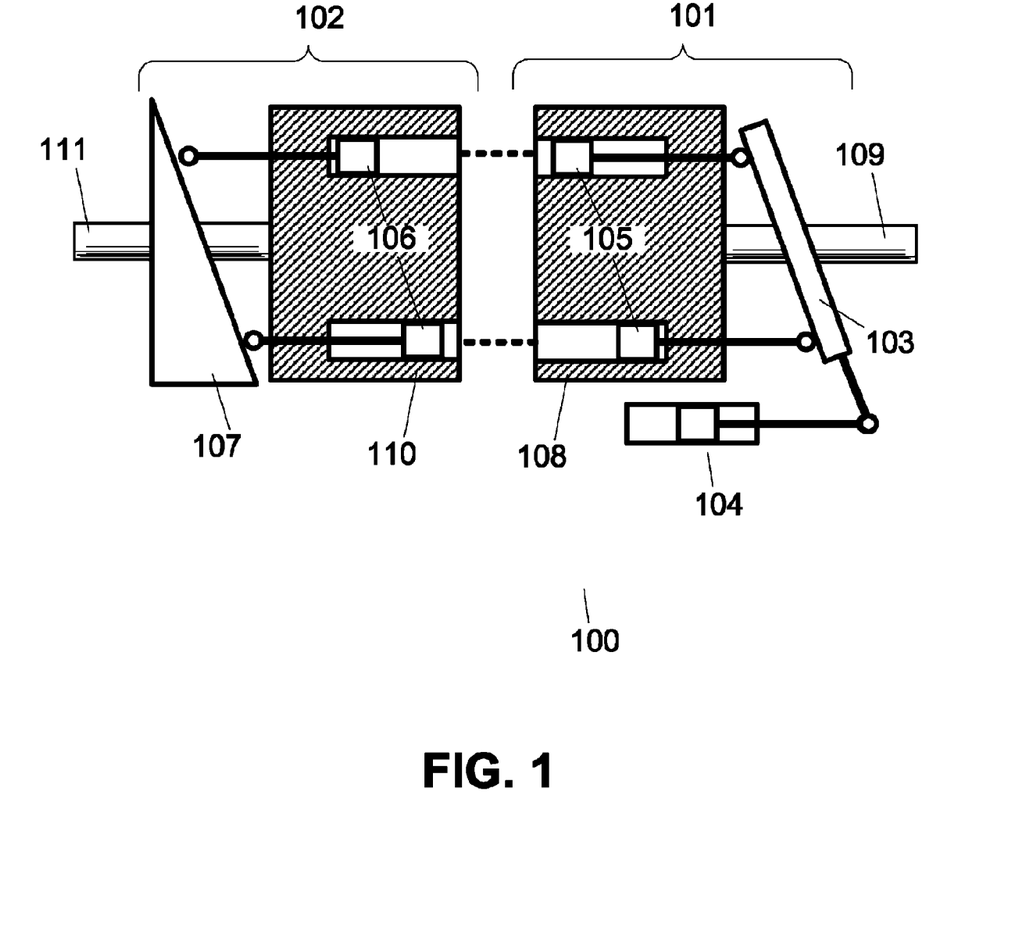
FIG. 1 is a schematic system diagram of a variator for providing a variable output torque based on an applied control pressure differential in accordance with the disclosed principles.

With this overview in mind, specific details of the described principles and system will now be discussed. FIG. 1 is a detailed schematic drawing of a variator 100 for providing a variable output torque based on an applied control pressure differential. The variator 100 comprises a pump 101 and a motor 102. The pump 101 comprises a variable angle swash plate 103 set by a swash plate actuator 104. A number of pistons 105 in respective chambers ride on the swash plate 103 via sliding contacts, such that the range of movement of the pistons 105 is set by the angle of the swash plate 103. The chambers for the pistons 105 are formed in a pump carrier 108 that is rotated via the pump input shaft 109.

The motor 102 comprises a similar arrangement including a number of pistons 106 in respective chambers. The pistons 106 of the motor 102 are slidably engaged upon a fixed swash plate 107. The chambers of the pistons 105 of the pump 101 are in fluid communication with the chambers of the pistons 106 of the motor 102 via hydraulic fluid that fills the chambers and intervening conduits (not shown). The chambers for the pistons 106 are formed in a motor carrier 110 that rotates the motor output shaft 111. As the angle of the swash plate 103 is varied, the amount of fluid displaced by the pistons 105 of the pump 101 (and thus the fluid volume received or taken from the chambers of the pistons 106) varies.

Because of these interrelationships, the torque and/or output speed of the motor 102 varies with the angle of swash plate 103. In overview, the swash plate actuator 104, which in this example operates on differential hydraulic pressure, is driven via solenoid valves (not shown in FIG. 1), e.g., one for each of two pressure values, controlled electronically by appropriate input signals from a transmission controller or the like. In this way, a controller can control the output speed of the variator 100 via the application of electrical signals to solenoid valves associated with the swash plate actuator 104.

Figure 2:
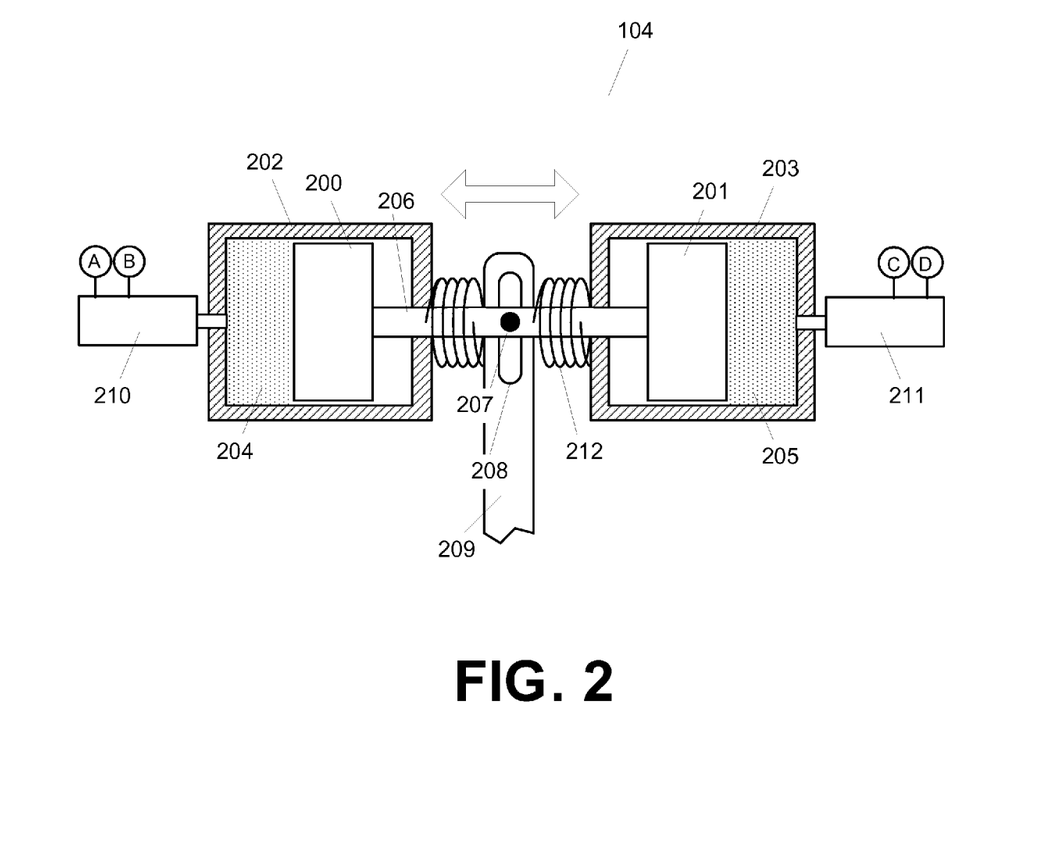
FIG. 2 is a detailed schematic drawing of a hydraulic actuator for controlling the position of a variable-angle swash plate in a variator in accordance with the disclosed principles.

FIG. 2 is a more detailed schematic drawing of the hydraulic actuator 104 for controlling the position of a variable-angle swash plate (not shown in FIG. 2) in a variator 100 such as that shown in FIG. 1. The actuator 104 includes a number of interrelated elements including primarily two opposed pistons 200, 201 (or opposed chambers of a single piston) within respective cylinders 202, 203. The pistons 200, 201 cooperate with the bores of their respective cylinders 202, 203 to form respective pressure chambers 204, 205 for containing pressurized hydraulic fluid.

The pistons 200, 201 are joined by a bar 206 which has a central pivot pin 207 mounted thereon. The central pivot pin 207 interferes within a slot 208 in a swash plate arm 209, such that the lateral position of the bar 206 establishes the position of the swash plate arm 209 and hence the angle of the swash plate itself (not shown). The bar 206 is biased to a central position by opposing springs 212. As the bar 206 is displaced from this central position, there is a restoring force exerted by springs 212 that is proportional to the displacement.

The lateral position of the bar 206 is determined by the positions of the pistons 200, 201 within the cylinders 202, 203. The positions of the pistons 200, 201 are determined by the difference in hydraulic pressure between the piston chambers 204, 205. Respective pressure valves 210, 211 independently control the pressure within chambers 204, 205. In an example, the pressure valves 210, 211 are solenoid valves that supply hydraulic fluid at a pressure that is set by an applied current within limits set by a supply pressure. Thus, in the illustrated example, each valve 210, 211 has at least a current input (illustrated as inputs A and C) and a fluid input (illustrated as inputs B and D). Typically, solenoid valves can supply fluid at any pressure between zero and the fluid pressure at the fluid input B, D. The pressure response of a solenoid valve such as solenoid valves 210 and 211 to a current input is a function of various components and their tolerances.

Because the distance between the pistons 200, 201 is fixed by the length of the bar 206, it is the pressure differential between chambers 204, 205 rather than the absolute pressure within each chamber 204, 205 that establishes the position of the bar 206. In particular, when the bar 206 is in such a position that the net displacement force differential between the pistons 200, 201 is equal to the net restoring force exerted by springs 212, the system is in equilibrium.

Considering FIG. 2 in conjunction with FIG. 1, it will be appreciated that the torque supplied at output 111 is related to the pressure differential applied by valves 210, 211. In particular, the fluid pressure within the hydraulic circuit between pistons 105 and 106 is related to the angle of swash plate 103, and the angle of swash plate 103 is related to the pressure differential applied by valves 210, 211. Thus, in torque-controlled applications like the present system, it is desirable to correlate combinations of solenoid currents for valves 210 and 211 (or applied pressure differential in actuator 104) with expected associated output torques at output 111.

Figure 3:
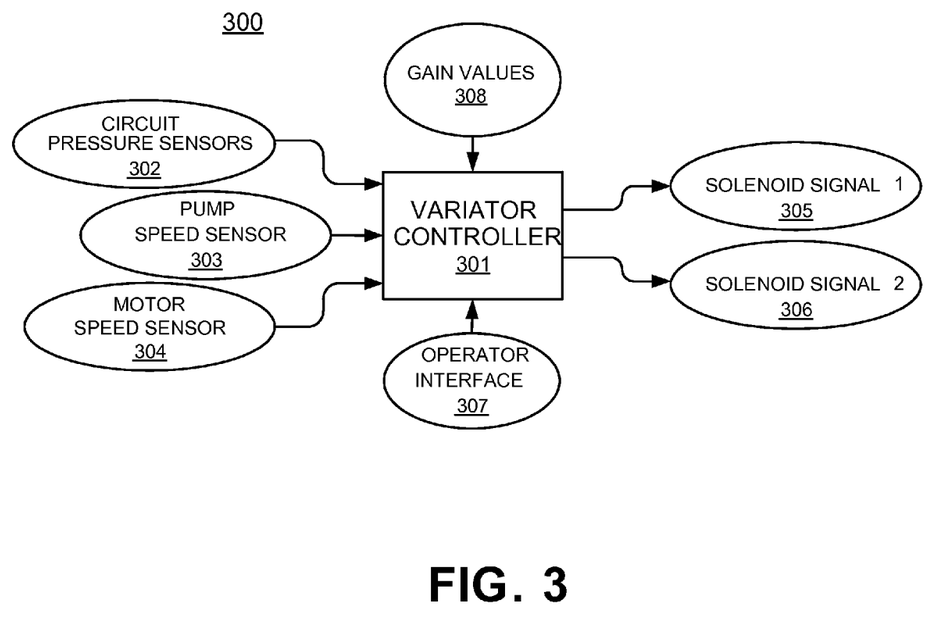
FIG. 3 is a simplified logical schematic of control components and data flow to control the variator in accordance with the disclosed principles.

To better understand the torque control provided by the presently describe principles, the control infrastructure and informational flow within the system will be discussed. FIG. 3 is a simplified logical schematic 300 of the data flow associated with the mechanical components of FIGS. 1 and 2 to operate the variator 100 effectively. In particular, a variator controller 301 is provided for controlling the operation of the variator 100 via solenoid valves 210 and 211. The variator controller 301 may be a dedicated variator controller, but more typically will also control a larger system, such as a transmission, associated with the variator 100. The controller 301 may be of any suitable construction, however in one example it comprises a digital processor system including a microprocessor circuit having data inputs and control outputs, operating in accordance with computer-readable instructions stored on a computer-readable medium. Typically, the processor will have associated therewith long-term (non-volatile) memory for storing the program instructions, as well as short-term (volatile) memory for storing operands and results during (or resulting from) processing.

In operation, the controller 301 receives a number of data inputs from the variator system 100 and provides a number of control outputs to the system 100. In particular, the controller 301 has a first data input connected to circuit pressure sensors 302 or other torque sensing devices or sensors. Although it is possible to use a single pressure sensor, it is desirable to use multiple sensors to obtain more accurate pressure readings. The circuit pressure sensors 302 are positioned and adapted to sense the hydraulic pressure within the internal hydraulic circuit of the variator 100 (i.e., between pistons 105 and 106) and to provide signals related to the sensed pressures. A second data input to the controller 301 is linked to a pump speed sensor 303. The pump speed sensor 303 is positioned and adapted to detect the rotational speed of the variator input shaft 108 and to provide a signal related to the sensed rotational input speed. A motor speed sensor 304 is linked to third data input of the controller 301. The motor speed sensor 304 is positioned and adapted to detect the rotational speed of the variator output shaft 110 and to provide a signal related to the sensed rotational output speed. It will be appreciated that the pump displacement (e.g., derived from the stroke of actuator 103) or the angle of the swash plate 103 (e.g., derived from an angle sensor) can be used as an input in place of the motor speed ratio.

In order to detect a desired torque, the controller 301 also receives a data input from the operator interface 307, e.g., an accelerator setting. The operator may be human or automated, and the operator interface 307 may vary accordingly. As noted above, the variator 100 operates in discrete modes, which may be automatically set and/or set based on user input.

The gain values 308 derived by the variator controller 301 are retrieved by the variator controller 301 during operation. Based on the various available data inputs as discussed above, the controller 301 calculates and provides appropriate control signals such that the variator 100 provides an output torque closely corresponding to the desired output torque. In particular, the controller 301 provides two solenoid control signals 305, 306 to control the operation of the actuator 104 and thus the operation of the variator 100. The solenoid control signals 305, 306 include a first solenoid control signal 305 to control a first one 210 of the actuator pressure valves and a second solenoid control signal 306 to control a second one 211 of the actuator pressure valves.

As noted above, however, it is difficult to accurately control torque in this type of transmission due to the slow response time. Thus, the described system provides torque control via a combination of open loop control, closed loop control, and a variable gain that depends upon various work parameters. In other words, the present control method applies different gain factors depending on machine operating parameters such as acceleration, speed (output speed, pump speed, machine speed), torque, and direction, as well as operator input, e.g., from an accelerator peddle, gear selector/shift, which provides an indication of future machine operation. The system applies higher gain factors to provide a better response time in situations wherein the system will tolerate high gain factors, but when the system is at a risk of instability, lower gain factors are applied. The applied gain data 308 may be stored in one or more look-up maps or may be implemented via a state machine.

In an embodiment, a reset is applied to prevent the gain from climbing improperly during major machine operations. Thus, for example, the system will reset the I term when shifting from one clutch to another in this embodiment. Instead of resetting the I term, the system may optionally lower the gain value during such operations.

Figure 4:
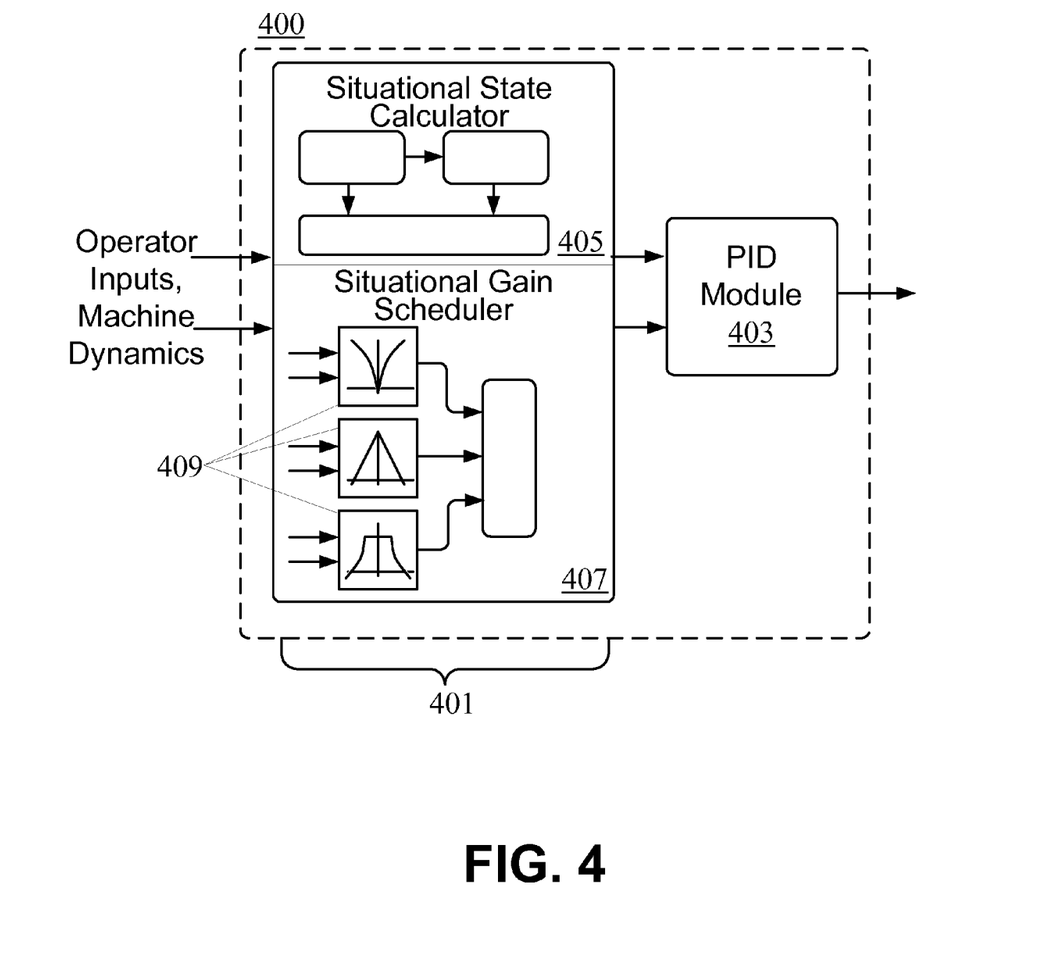
FIG. 4 is a logical flow schematic illustrating the manner in which gain scheduling is executed in accordance with the disclosed principles.

FIG. 4 is a logical flow schematic illustrating the manner in which gain scheduling is executed in accordance with the disclosed principles. In particular, the control logic 400, which may be implemented within or as part of the variator controller 301, includes a gain provision module 401 and a gain application module, i.e., PID module 403.

The PID module 403 implements a proportional (P)/integral (I)/derivative (D) algorithm to minimize a deviation from the desired torque by adjusting parameters such as solenoid signal 1 (305) and solenoid signal 2 (306). In brief, the proportional value contributes a reaction based on the magnitude of the deviation, while the other two terms relate to the occurrence over time and the rate of deviation. In particular, the integral value contributes a reaction based on a sum of recent deviations, and the derivative value contributes a reaction based on the rate at which the deviation is changing. In other words, a low and rapidly increasing deviation might have a similar correction applied as a higher but more slowly increasing deviation.

The gain provision module 401 includes a situational state calculator 405 and a situational gain scheduler 407. The situational state calculator 405 determines a state of the machine based on machine operational values such as speed, torque, direction, and any other value in a given implementation that may have a significant effect on the transmission control response characteristics. Each state is associated with a particular correlated gain or set of correlated gains. After the state of the machine system is identified within the situational state calculator 405, the situational gain scheduler 407 selects a gain based on the system state. Several gain curves 409 are illustrated with the situational gain scheduler 407, reflecting that different curves may apply for different machine states, and that the appropriate gain in a given state may be derived from the curve for that state.

Once the appropriate gain has been identified, it is passed to the PID module 403 for calculation of appropriate hydraulic pressure valve control signals to implement the desired machine behavior, e.g., the desired torque. As noted above, the gain values may be applied within the integral portion of the PID operation in a particular embodiment of the described principles, although such is not required in every embodiment.

Figure 5:
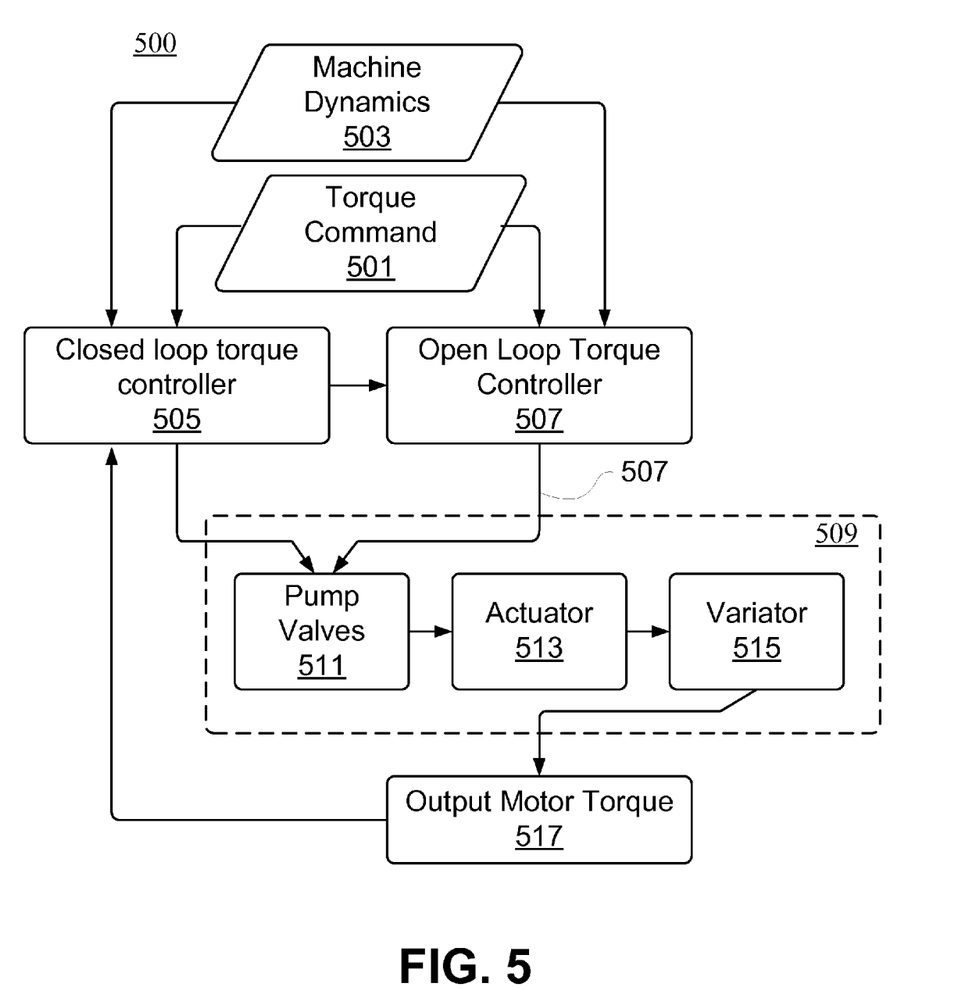
FIG. 5 is a data flow and operational schematic illustrating the manner in which gain scheduling is executed in accordance with the disclosed principles.

Given the process and architecture for deriving corrective values based on the system state, the machine configuration for applying those corrective values is shown schematically in FIG. 5. In particular, FIG. 5 is a data flow and operational schematic illustrating the manner in which gain scheduling is executed in accordance with the disclosed principles.

The flow 500 of FIG. 5 begins with a torque command 501, e.g., from a user via a user interface. Machine situational information 503 is also provided, e.g., from appropriate sensors. The torque command 501 and machine situational information 503 are provided to a closed loop torque controller 505 and an open loop torque controller 507. Other machine elements may also feed into the closed loop torque controller 505. For example, acceleration and deceleration pedals can feed into the closed loop torque controller 505 and may be used to modify the torque command as appropriate. Similarly, brakes, shifters, etc. may also affect the operation of the closed loop torque controller 505.

The results of these controllers, i.e., closed loop torque controller 505 and open loop torque controller 507, are provided to the transmission 509. In particular, the results of the closed loop torque controller 505 and open loop torque controller 507 are used to control the pump valves 511 (e.g., pressure valves 210, 211), which respond by adjusting to the commanded level. The pump valves 511 control the actuator 513 (e.g., swash plate actuator 104). The position of the actuator 513 modifies the operation of the variator 515 (e.g., variator 100 of FIG. 1), which provides a motor torque output 517 substantially matching the initial torque command 501. In this manner, accurate and efficient gain-compensated control of torque is provided.

INDUSTRIAL APPLICABILITY

The described principles are applicable to machines requiring a transmission to link a power source to the final ground-engaging mechanism, e.g., wheels, tracks, etc., and/or to another powered function or implement. Examples of such machines include machines used for mining, construction, farming, transportation, or any other industry known in the art. For example, the machine may be an earth-moving machine, such as a wheel loader, excavator, dump truck, backhoe, motor grader, material handler or the like. Exemplary implements include, without limitation, buckets, compactors, forked lifting devices, brushes, grapples, cutters, shears, blades, breakers/hammers, augers, and others.

Within such applications, the described principles apply to the operation of hydrostatic and hydraulic continuously variable transmissions to allow accurate torque control using a combined closed loop/open loop control configuration. This allows the operation of the host machine to be controlled in a more effective manner than simple traditional speed control or other alternative control strategies.

It will be appreciated that the foregoing description provides useful examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for the features of interest, but not to exclude such from the scope of the disclosure entirely unless otherwise specifically indicated.

Recitation of ranges of values herein are merely intended to serve as a shorthand method of referring individually to each separate value falling within the range, unless otherwise indicated herein, and each separate value is incorporated into the specification as if it were individually recited herein.

We claim:

1. A method for providing, in a machine including a hydrostatic transmission, output torque control having situation-based system response, the method comprising:
    maintaining a plurality of state-based gain schedules associated with situational states of the machine;
    determining machine operational values for the machine;
    determining, by a situational state calculator, a situational state of the machine based on the machine operational values;
    selecting, by a situational gain scheduler, a gain value based on the situational state of the machine, the selecting including at least specifying one of the plurality of state-based gain schedules based upon the situational state of the machine; and
    executing output torque control of the hydrostatic transmission via a closed loop control module and an open loop control module, wherein the closed loop control module applies the gain value to render a closed loop torque control output value.

2. The method for providing output torque control according to claim 1, wherein the closed loop control module executes a PID control strategy, and wherein the closed loop control module applies the gain value in an integral stage of the PID control strategy.

3. The method for providing output torque control according to claim 2, wherein the machine operational values include a value indicating activation of a machine control.

4. The method for providing output torque control according to claim 3, wherein the machine control is one of the group consisting of: a transmission shift control, a deceleration control, and an acceleration control.

5. The method for providing output torque control according to claim 2, further comprising detecting activation of a machine control and resetting the integral stage of the PID control strategy based on the detected activation.

6. The method for providing output torque control according to claim 5, wherein the activated machine control is one of the group consisting of: a transmission shift control, a deceleration control, and an acceleration control.

7. The method for providing output torque control according to claim 1, wherein executing output torque control of the hydrostatic transmission includes providing actuation signals to one or more hydraulic pressure valves to control a swash plate actuator of a variator.

8. A controller for providing, in a machine including a hydrostatic transmission, output torque control having situation-based system response, the controller comprising a non-transitory computer readable medium having thereon computer executable instructions executed by the controller to facilitate performing the steps comprising:
    maintaining a plurality of state-based gain schedules associated with situational states of the machine;
    determining machine operational values for the machine;
    determining, by a situational state calculator, a situational state of the machine based on the machine operational values;
    selecting, by a situational gain scheduler, a gain value based on the situational state of the machine, the selecting including at least specifying one of the plurality of state-based gain schedules based upon the situational state of the machine; and
    executing output torque control of the hydrostatic transmission via a closed loop control module and an open loop control module, wherein the closed loop control module applies the gain value to render a closed loop control output value.

9. The controller for providing output torque control according to claim 8, wherein the closed loop control module executes a PID control strategy, and wherein the closed loop control module applies the gain value in an integral stage of the PID control strategy.

10. The controller for providing output torque control according to claim 9, wherein the machine operational values include a value indicating activation of a machine control.

11. The controller for providing output torque control according to claim 10, wherein the machine control is one of the group consisting of: a transmission shift control, a deceleration control, and an acceleration control.

12. The controller for providing output torque control according to claim 9, further comprising instructions for detecting activation of a machine control and for resetting the integral stage of the PID control strategy based on the detected activation.

13. The controller for providing output torque control according to claim 12, wherein the machine control is one of the group consisting of: a transmission shift control, a deceleration control, and an acceleration control.

14. The controller for providing output torque control according to claim 8, wherein the instructions for executing output torque control of the hydrostatic transmission include instructions for providing actuation signals to one or more hydraulic pressure valves to control a swash plate actuator of a variator.

15. A machine for employing transmission, in a machine, output torque control having situation-based system response, the machine comprising:
    a hydrostatic transmission;
    a plurality of user input elements operable by a machine user to affect the operation of the hydrostatic transmission;
    a plurality of state-based gain schedules associated with situational states of the machine;
    a measurement facility for determining machine operational values for the machine; and
    a controller configured with a non-transitory computer-readable medium including computer-executable instructions facilitating:

determining a situational state of the machine based on the machine operational values, selecting a gain value based on the situational state of the machine, the selecting including at least specifying one of the plurality of state-based gain schedules based upon the situational state of the machine, and executing output torque control of the hydrostatic transmission via a closed loop control module and an open loop control module, wherein the closed loop control module applies the gain value to render a closed loop control output value.

16. The machine for employing transmission output torque control according to claim 15, wherein the closed loop control module executes a PID control strategy, and wherein the closed loop control module applies the gain value in an integral stage of the PID control strategy.

17. The machine for employing transmission output torque control according to claim 16, wherein the machine operational values include a value indicating activation of a machine control.

18. The machine for employing transmission output torque control according to claim 17, wherein the machine control is one of the group consisting of: a transmission shift control, a deceleration control, and an acceleration control.

19. The machine for employing transmission output torque control according to claim 16, further comprising detecting activation of a machine control and resetting the integral stage of the PID control strategy based on the detected activation.

20. The machine for employing transmission output torque control according to claim 15, wherein executing output torque control of the hydrostatic transmission includes providing actuation signals to one or more hydraulic pressure valves to control a swash plate actuator of a variator.

* * * * *